United States Patent [19]

McCullough et al.

[11] 4,127,280
[45] Nov. 28, 1978

[54] COLLAPSIBLE BAG TYPE CONTAINER TAKE-UP REEL

[75] Inventors: Michael J. McCullough, Wilmington, Del.; Frederic T. Taraschi, Haddon Heights, N.J.

[73] Assignee: E. I. Du Pont de Nemours and Company, Wilmington, Del.

[21] Appl. No.: 693,116

[22] Filed: Jun. 4, 1976

[51] Int. Cl.² .............................................. B60P 3/22
[52] U.S. Cl. ............................... 280/5 D; 242/86.52
[58] Field of Search ............... 242/86.52, 86.5 R, 74; 254/166; 280/5 D

[56] References Cited

U.S. PATENT DOCUMENTS

| 1,186,729 | 6/1916 | Baker | 242/86.52 |
| 1,307,559 | 6/1919 | McNeilly | 242/86.52 |
| 2,811,321 | 10/1957 | La Barre | 242/86.52 |
| 3,091,414 | 5/1963 | Patnaude | 242/86.52 |
| 3,095,206 | 6/1963 | Fresia | 280/5 |
| 3,325,120 | 6/1967 | Brinkman | 242/86.52 |
| 3,403,870 | 10/1968 | Gargboux | 242/86.52 |

FOREIGN PATENT DOCUMENTS 630,102  12/1961  Italy .............................................. 280/5

Primary Examiner—Edward J. McCarthy

[57] ABSTRACT

A take-up reel for collapsible bag type shipping containers utilizing a rotatable reel mounted on a dolly linearly reciprocable lengthwise of a transport vehicle.

1 Claim, 5 Drawing Figures

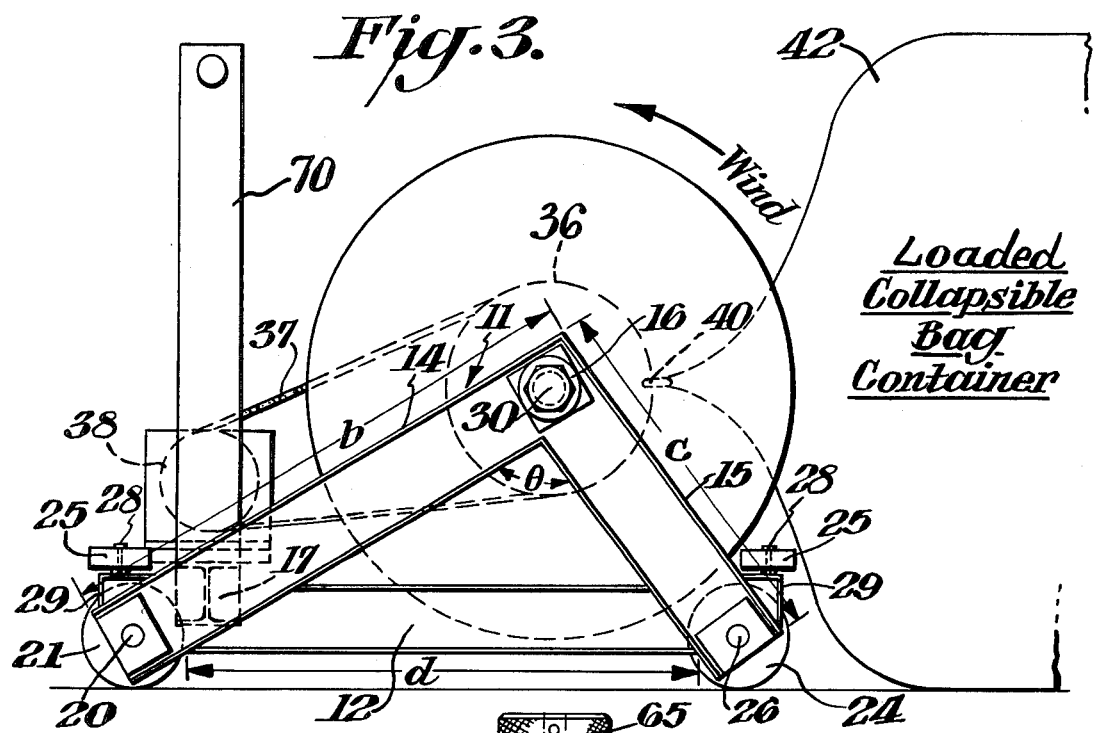
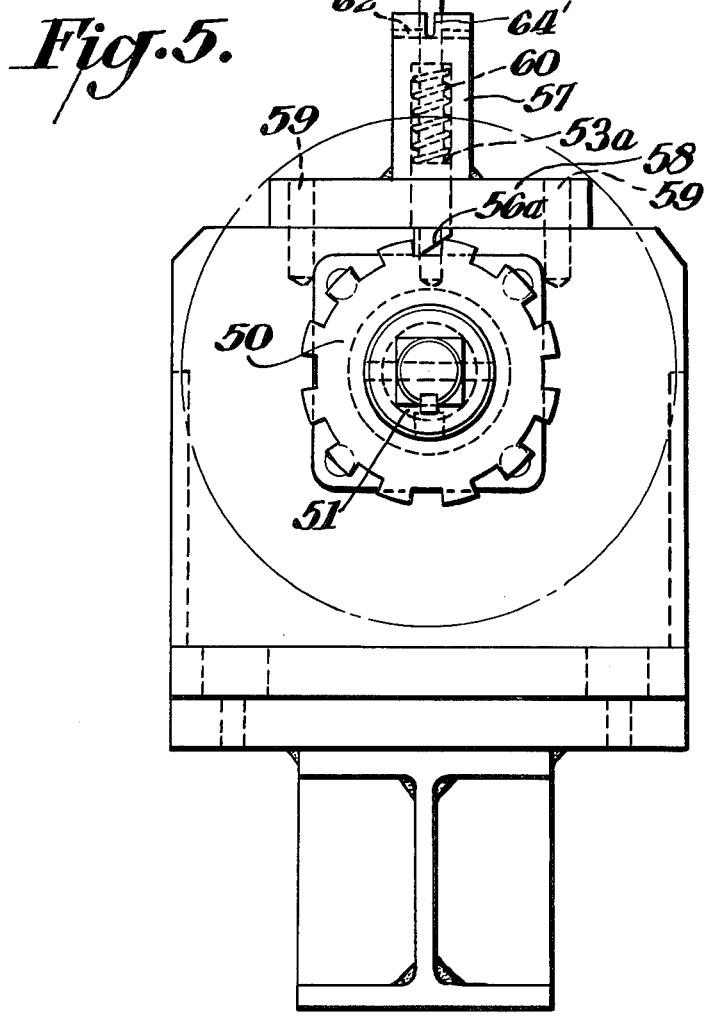

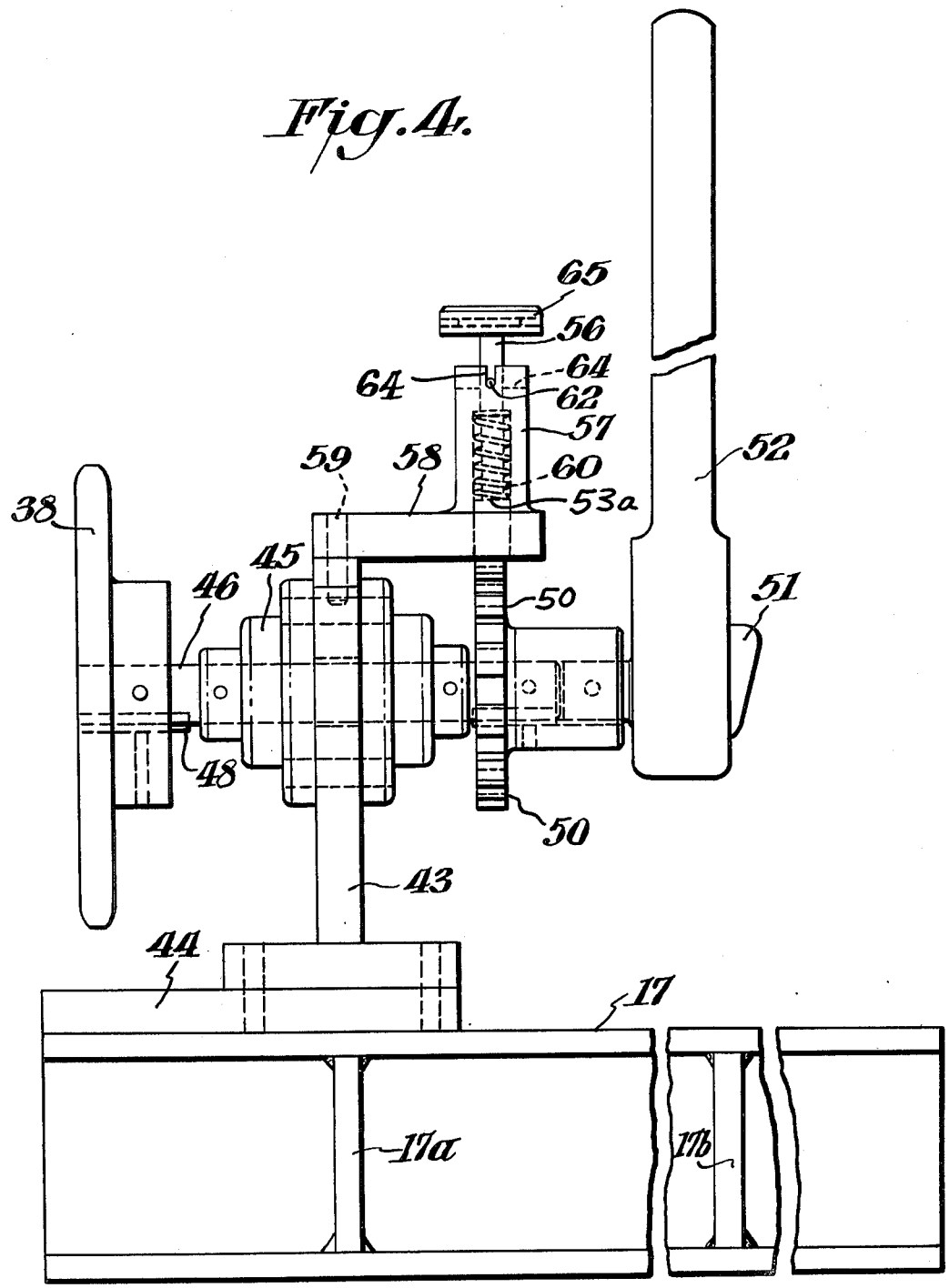

COLLAPSIBLE BAG TYPE CONTAINER TAKE-UP REEL

BRIEF SUMMARY OF THE INVENTION

Generally, this invention comprises a collapsible bag type shipping container take-up reel for a truck trailer vehicle comprising a rotatable flanged spool mounted with longitudinal axis substantially horizontal transverse the trailer vehicle supported for rotation upon a movable dolly, the dolly carrying means in drive connection with the rotatable spool, and connection means attached to the spool for engagement with companionate connection means disposed at the sealed end of the collapsible bag container.

DRAWINGS

The following drawings constitute part of this specification, in which

Figure 2:
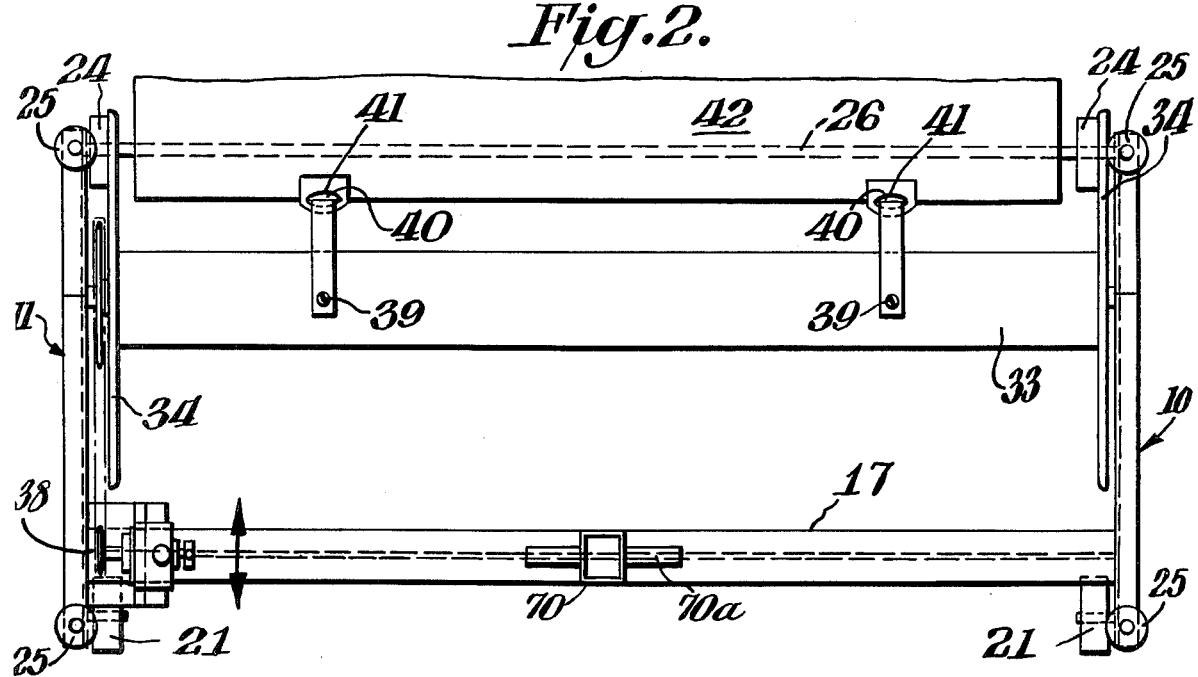
Figure 1:
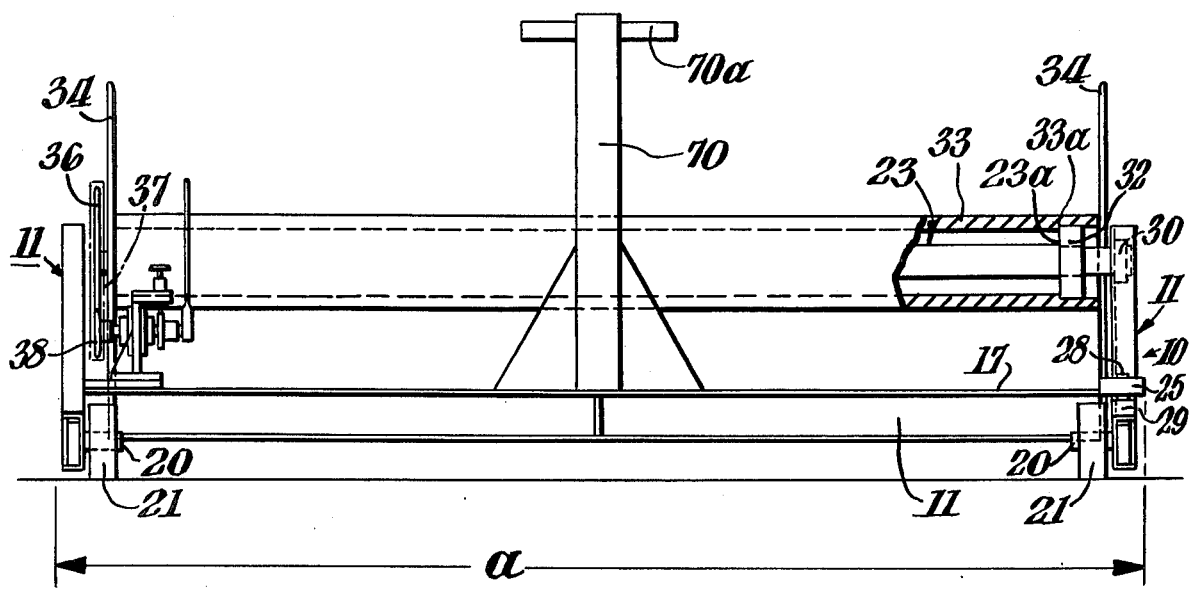

FIG. 1 is a rear elevation view, partly in broken away section, of a preferred embodiment of this invention, with the left-hand guide wheel 25 omitted to better show the spool drive connection, FIG. 2 is a plan view of the apparatus of FIG. 1, FIG. 3 is a side elevation view looking from the right-hand ends of the apparatus of FIGS. 1 and 2, FIG. 4 is a rear elevation view of a preferred manual drive means for the manual drive apparatus of FIGS. 1-3, and FIG. 5 is an end elevation view of the apparatus of FIG. 4 as viewed from the right-hand end with the ratchet wrench removed.

BACKGROUND

It is often advantageous to transport liquid cargo to a given destination and then load with solid cargo for the return trip. This has been effected by using collapsible liquid cargo bags, fabricated from rubber or other elastomeric material, which are closed at one end (assumed, in this instance, to be disposed at the outboard end of the trailer) and are provided with cargo discharge means, such as a valved nozzle at the other end. With this design, the trailer body is provided with an opening at the forward part of the trailer affording ready access to the bag discharge nozzle. These bags are preferably employed singly in diameters roughly the width of the truck trailer body, leaving enough side clearance to accommodate transverse tie-down straps secured to the trailer floor, and of a length approximating that of the trailer body, so that the trailer end doors can be closed freely while still leaving enough space for the take-up reel of this invention.

It has hitherto been the practice to unload bag cargo by gravity flow from the bags and, when the bags reach a deflation where they no longer discharge their contents under gravity, to manually roll them up lengthwise somewhat in the manner of a rug towards the front end of the trailer, thereby opening up the major length of the trailer body for reception of dry cargo for the return trip.

THE INVENTION

This invention comprises a take-up reel for collapsible bag type shipping containers which reduces the labor of empty container handling, speeds the discharge of bag contents, and provides neat storage for the collapsed bag container when dry cargo is transported by trailer.

Referring to FIGS. 1-3, inclusive, there is provided a particularly load-stable design of dolly, denoted generally at 10, incorporating two vertically disposed steel side trusses, denoted generally at 11. The side trusses are made up of three outwardly oriented channel irons, the bottom one 12 of which is, typically, 4 inches wide whereas the inclined ones 14 and 15 are, typically, 5 inches wide, weld-joined in a common plane at their intersecting ends and cut to lengths $b$, $c$ and $d$ (refer FIG. 3) having relative proportions of approximately 33 inches: 22.25 inches: 32.12 inches, respectively. The inside angles $\theta$ defined by channels 14 and 15 measure approximately 98° and the weld junctures thereof are drilled at the intersections of the longitudinal axes of the channels to provide 2 inches through bores which are reinforced on the outside faces by 1 inch thick weld-attached annuli 16 having inside diameters of 2 inches aligned concentric with the through bores, and outside diameters of 4 inches.

The two side trusses are supported vertically by weld attachment near the lower ends of channels 14 to the ends of transverse I-beam 17, which, in service, is disposed generally width-wise of the truck trailer body. The depending ends of the channels 14 are drilled to receive the weld-attached bearing shafts 20 of rear transport wheels 21, which are of sufficient diameter to support trusses 11 clear of the trailer floor. Similarly, the lower ends of channels 15 are drilled to receive the bolt-attached ends of interiorly threaded axle 26 upon which are journaled from transport wheels 24 of the same diameter as rear wheels 21. The overall width of the dolly, measured across the outside faces of trusses 11, is preferably nearly equal to the inside width of the truck trailer body, a clearance of approximately ¾ inches being allowed on each side from truss to inside wall.

To forestall possible cross-wedging of the dolly athwart the trailer width, it is preferred to provide four corner-mounted free-rolling guide wheels 25, each journaled on vertical stub shafts 28 secured in brackets 29, weld-joined to the lower terminal edges of channels 14 and 15. Vertical shafts 28, in order to accommodate for slight variations in trailer inside dimensions, are preferably mounted so that the peripheries of guide wheels 25 overhang slightly the outside flanges of trusses 11 to thereby bear on the truck-trailer inside wall surfaces with a small clearance ensuring unrestrained dolly movement lengthwise of the trailer body.

Axle 23 is a hollow tubular shaft abutting at its ends the inside faces of trusses 11 and securely fixed thereto by bolts 30 passing through the 2 inch bores in trusses 11 and engaging with inside threads tapped into the axle ends. The axle 23 is provided with small external shoulder enlargements 23$a$ against which the inner races of a pair of roller bearings 32 abut. Spool shaft 33 is provided with internal shoulder constroctions 33$a$ opposite shoulders 23$a$ against which the outer races of roller bearings 32 abut, so that spool shaft 33 is journaled for free rotation on bearings 32. Key-locked bearing lock nuts (not shown) are provided for both roller bearings 32.

The spool ends 34, which can typically have an outside diameter of 30 inches, are secured to the ends of spool shaft 33 by machine screws. As viewed in FIGS. 1 and 3, the left-hand end of axle 23 is provided, to the left of left-hand spool end 34 and to the right of left-hand truss 11, with a drive sprocket 36 securely keyed thereto, which is driven by chain 37 engagement to driver sprocket 38, hereinafter described. A pair of radial in-line tapped screw holes are provided in spool shaft 33 equidistant from the ends thereof receiving retention screws 39 attaching hooks 40 adapted to engage with companionate eyes 41 fixedly attached to the sealed end of collapsible bag container 42 as seen in FIGS. 2 and 3. (If desired, eyes of design such as the companionate eyes 41 can be provided on the spool shaft replacing hooks 40, connection with spool shaft 33 then being by means of webbed belts provided with conventional buckles.)

A manual drive mechanism is described for this embodiment of the invention, it being understood that an electrically powered drive can be substituted if an electric power source is always available for connection via an extension cord.

Referring to FIGS. 4 and 5 particularly, there is provided a pillow block 43 bolt-attached to a base plate 44 welded to the top flange of I-beam 17, which latter can be reinforced by vertical flange-to-flange weldments 17a, 17b spaced along the beam length. Pillow block 43 supports a bearing 45 within which is journaled drive shaft 46 carrying driver sprocket 38 attached thereto by key 48. A ratchet wheel 50 is keyed to the inboard end of shaft 46, which end is machined to a square head terminus 51 adapted to receive a conventional ratchet wrench 52, typically 1 inch size.

The companionate pawl for ratchet wheel 50 is a rotatable pin 56 (hereinafter referred to as a "pawl pin") slidably positioned within the bore of an upstanding boss 57 radially overlying ratchet wheel 50 welded to a horizontal strut 58 attached to the top ends of bearing 45 by screws 59.

Pawl pin 56 is biased downwardly into radial engagement with the recesses in ratchet wheel 50 by a free compression spring 60, bearing on radial shoulder 53a at the lower end of pawl pin 56, and is provided near its upper end with a diametral pin 62. Two diametrical slots are machined in the upper end of boss 57, one 64 in the plane of ratchet wheel 50 and the other 64' at 90° thereto. The upper end of pin 56 is provided with a pin-secured knurled knob 65 enabling easy manual lifting of pin 56 against the downward urging of spring 60 to thereby free the lower end of pin 56 from engagement with ratchet wheel 50. The bottom end of pin 56 is beveled at 56a across its full width at an angle of, typically, 30°, so that successive teeth of ratchet wheel 50 will bias pawl pin 56 out of engagement with the ratchet wheel whenever ratchet wrench 52 is utilized in a counter-clockwise direction referred to FIG. 5, as occurs during wind-up of the collapsible bag container 42 on spool shaft 33, but will prevent drum movement in the opposite (clockwise) direction. Conversely, when pawl pin 56 is rotated 180°, its pin 62 locks it within the pin slot 64 lying in the plane parallel with ratchet wheel 50, thereby disposing bevel 56a in the 180° reverse direction from that shown in FIG. 5. This frees wheel 50 for rotation in a clockwise sense, while barring any movement in the counterclockwise direction.

If it is desired to lock the apparatus against all rotational movement, the operator simply pulls pin 56 free of ratchet wheel 50 and then reseats it at 90°, or midway, between full reverse positions, thereupon positioning bevel end 56a transverse the axis of shaft 46, where the teeth of ratchet wheel 50 cannot displace the pin in either rotational sense. Finally, if the operator wishes to free ratchet wheel 50 entirely, he simply pulls pin 62 out of engagement with both slots 64, 64' and rests the pin on the top rim of boss 57 free of the slots, thereby maintaining beveled end 56a entirely clear of the teeth of wheel 50.

A short vertical handle 70, fitted with a handle bar 70a, is attached by welding or otherwise to the top of I-beam 17, this constituting a convenience for the operator in pushing the dolly along the trailer body.

In service, after a solid or boxed cargo is unloaded, empty collapsible bag container 42 is unwound from its dolly, which can be locked at the trailer head end against movement lengthwise of the truck-trailer body by blocks, retention hooks or the like, not shown when dry cargo is transported.

The liquid cargo is then loaded under pressure into bag container 42 by connection of a loading dock feed spout to the container valve fixed to the inboard end of the bag container, thereby distending it to flat elliptical cross-section under an internal pressure of, typically, 3–5 p.s.i. for ladings of 6 to 10.5 lbs/gal and 5 to 7 p.s.i. for liquids weighing 10.5 to 15 lbs/gal. Collapsible bag containers are available commercially in sizes ranging from 1000 to 4570 gallons and are transported completely full, in order to avoid surge effects in transit. It will be understood that, when bag container 42 is full of liquid cargo, the take-up reel of this invention will be in travel position within a relatively small free area existing at the outboard end of the trailer body adjacent its doors, but clear thereof, so that it is readily accessible to unloading personnel at the delivery destination.

Previously, in gravity unloading of collapsible bag containers it was advocated that the sealed end of the bag be elevated by disposing the rear trailer wheels in an elevated position using a portable ramp. However, this is inconvenient and, often, gravity unloading has to be conducted with the vehicle in a horizontal or even reverse-sloped plane, under which circumstances unloading is either incomplete or at least at a relatively slow rate.

Using the reel of this invention, the operator can gradually wind the closed (sealed) end of the collapsible bag onto the reel in the course of unloading, thereby reducing the unloading time to a fraction of that previously required, while, at the same time, expelling the maximum of the liquid contents from the bag.

When the container bag is completely empty, the flattened bag will have been wound onto the dolly reel, and the dolly will be disposed in storage position at the front (closed) wall of the trailer body, thereby opening practically the full length of the trailer body to solid cargo loading.

What is claimed is:

1. A storage reel for a collapsible bag container for transportation within a truck trailer body, said collapsible bag container having a sealed end and an opposite end provided with a valve for introducing or expelling liquid cargo into or from said bag container, comprising a rotatable spool mounted with longitudinal axis substantially horizontal and oriented generally transverse said trailer body, supported for rotation upon a movable dolly, said dolly being provided with drive means effecting, at the operators's option, either clockwise or counter-clockwise rotation of said rotatable spool, said dolly being further provided with lateral rotatable guide wheels having axes of rotation substantially vertical, said lateral guide wheels bearing on the interior side walls of said trailer body to provide guidance for balanced take-up of the associated collapsible bag container, and connection means attached to said spool engaging with companionate connection means disposed at said sealed end of said collapsible bag container.

* * * * *